March 8, 1966     H. T. SCHROLL ETAL     3,239,282

BALL BEARING RETAINER

Filed June 20, 1962     3 Sheets-Sheet 1

INVENTORS.
HERMAN T. SCHROLL &
JOHN MUIR
BY
ATTORNEYS

INVENTORS.
HERMAN T. SCHROLL &
JOHN MUIR

United States Patent Office 3,239,282
Patented Mar. 8, 1966

1

3,239,282
BALL BEARING RETAINER
Herman T. Schroll and John A. Muir, Detroit, Mich., assignors to Die Supply Corporation, Cleveland, Ohio, a corporation of Ohio
Filed June 20, 1962, Ser. No. 203,873
3 Claims. (Cl. 308—6)

This invention relates to ball bearing retainers, and has particular reference to cylindrical ball-element holding retainers of the type employed in punch press die sets for the guidance and alignment of relatively removable punch and die sections.

As heretofore constructed, such bearing retainers have been made from solid wall, hollow cylinders of both metallic and non-metallic materials. The manufacture of this conventional type of retainer, in which the ball elements are individually positioned and staked in individually drilled holes or seats, is a slow, tedious and expensive method of manufacture. For instance, if solid wall retainers are to be economically gang drilled, there is a limitation on the closeness at which holes can be drilled one to the other because of drill chuck space requirements. Drilled holes must be bottomed; in order to enjoy reasonable tool life there is a practical limitation in the allowable toughness or hardness of the retainer material; and with solid wall retainers, peripheral containment of balls is not normally possible.

It is, therefore, our concept to provide a retainer comprised of inner and outer cylindrical shells formed in a novel manner from thin flat sheet material, said shells being concentrically spaced apart to house peripherally contained balls therebetween. With our construction there is no limitation on the closeness of holes because the holes are punched rather than drilled and this operation is performed while the material is in the flat condition. Furthermore, flat strip material is much cheaper than tube and punching is also cheaper than drilling; tougher, harder, higher quality material can be used for less cost; a greater selection of materials are available; the spaced inner and outer walls provides a cooling effect not present in solid wall containers. Peripheral containment of balls is superior to mere "staking" of balls at two or more points; the spaced inner and outer shells provide excellent qualities of rigidity which can be controlled by the judicious employment of spacer rings; and the retainer can be lubricated by packing solid or semisolid lubricants between the inner and outer walls. It is not necessary to continuous seam weld the inner and outer shells since spot welding has proved to be more than sufficient. Assembly is facilitated by making the outer shell in plurality of cylindrical sectors. With the use of flat strip material there is no limitation on the length of the retainer. Thus, a retainer can be made of any length and cut to standard size or special order as required. In another concept, the retainer can be made on a high production basis by continuous forming the inner shell from flat strip to tube.

It is, therefore, among the objects of this invention to provide: a cylindrical retainer of the type wherein the wall formation is such as to enable the retainer to be more economically produced and assembled than has been possible with prior art retainers; a retainer which is more durable and maintenance free than solid wall type retainers; a retainer comprising an inner-cylindrical shell of thin sheet material which may be pre-perforated in the flat state and then formed into the cylindrical shape, and a plurality of cylindrical sectors each of which may also be pre-perforated in the flat state from thin strip material and then formed into sectors of an outer cylindrical shell; a retainer having an inner and outer shell with end portions capped to enclose an inner space appropriate to contain solid or semi-solid state lubricant for longer ball bearing life; and, improved methods of making such retainers by forming an inner-cylindrical shell from flat strip material and an outer cylindrical shell from flat strip material formed into a plurality of sectors, placing a plurality of ball bearings in the perforations on either the concave surface of a sector or the convex surface of the cylindrical shell and securing said shell and said sector together, and thereafter repeating this operation until the inner-shell is completely encircled by a plurality of outer-shell sector members encasing ball bearings therebetween.

Other objects, advantages and features of construction and formation of the invention wall become apparent by those skilled in the art upon study of the following description and accompanying drawings, wherein.

Figure 1:
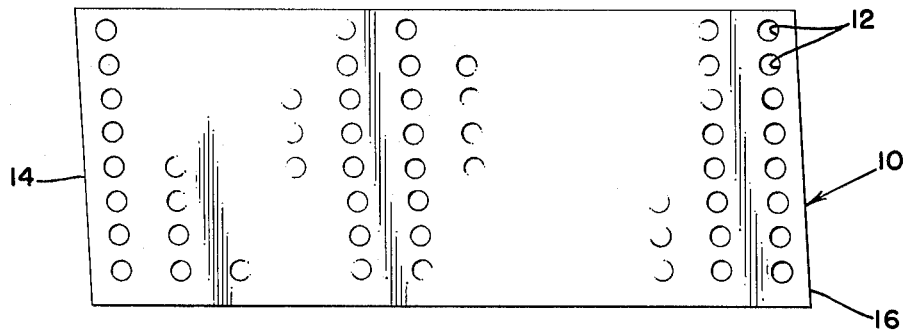
FIGURE 1 is a plan view of a perforated strip from which the inner cylindrical shell of the invention is made.
Figure 2:
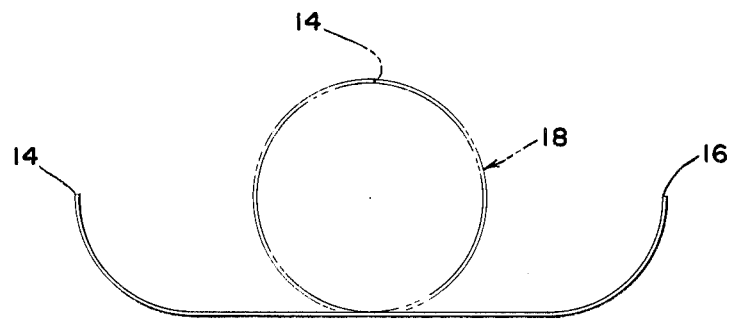
FIGURE 2 is an edge view of the strip of FIGURE 1 shown partially formed in phantom, and fully formed into an inner-cylindrical shell.
Figure 3:
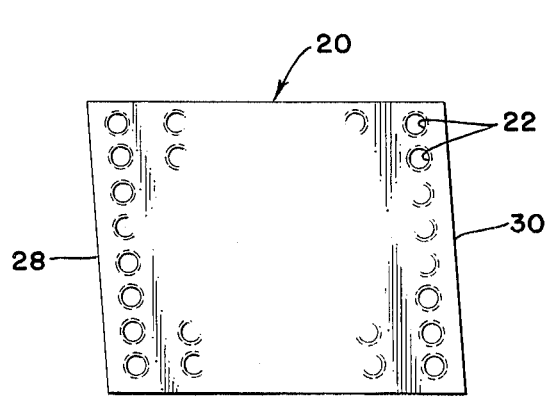
FIGURE 3 is a plan view of a perforated strip from which a cylindrical sector may be formed, when in combination with similar cylindrical sectors will concentrically encircle the inner-cylindrical shell of FIGURE 2 with sufficient space therebetween to retain ball bearings in the preformed holes of the sectors and the inner-shell respectively.
Figure 4:
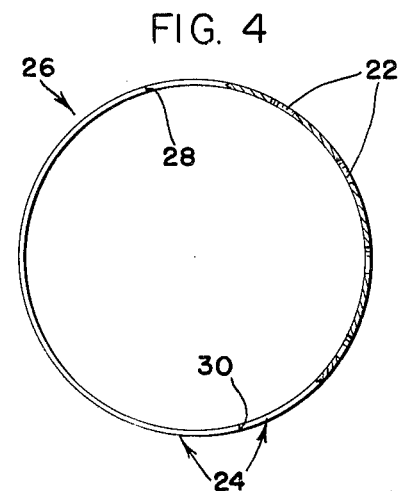
FIGURE 4 is an edge view of a formed cylindrical sector made from flat strip material shown in FIGURE 3.
Figure 5:
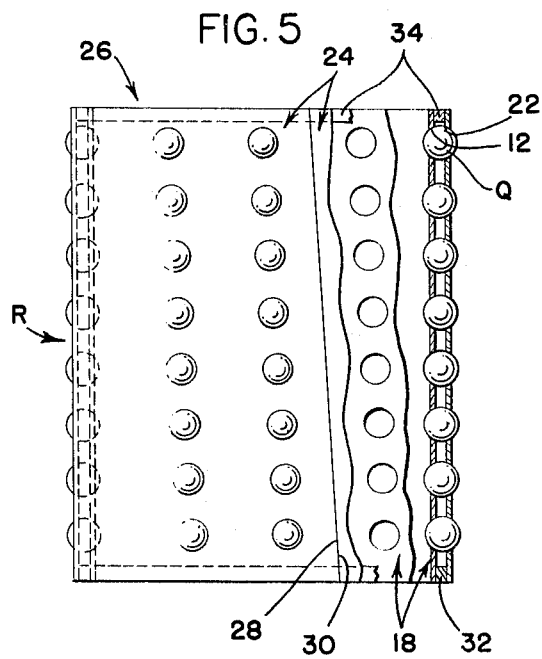
FIGURE 5 is an elevational view of the assembled ball bearing retainer.
Figure 6:
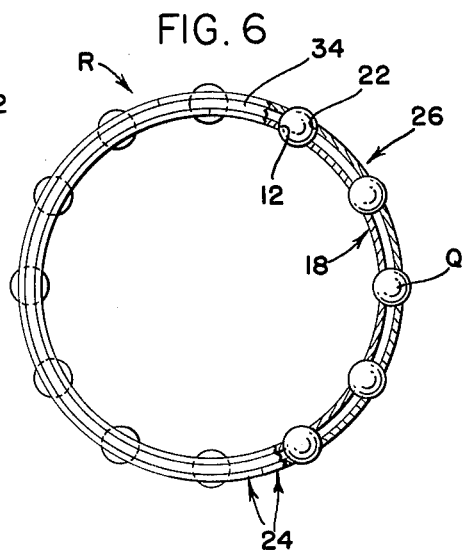
FIGURE 6 is an end view of the ball bearing retainer shown in FIGURE 5.
Figure 7:
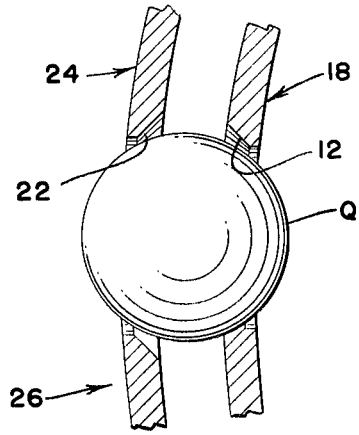
FIGURE 7 is a fragmentary sectional view of a portion of the ball bearing retainer showing the seating of a ball bearing in a pair of registered holes in a cylindrical shell and the cylindrical sector respectively.

Referring now to the drawings in greater detail, a piece of thin flat sheet material 10 (FIGURE 1) may be quickly gang punched to provide a plurality of ball bearing retaining holes or seats 12. It will be observed that the strip is parallelogram, but it is not rectangular. Thus, side edges 14 and 16 are parallel and inclined slightly to the vertical, and the holes 12 are aligned in columns parallel to the side edges. The purpose of this alignment of holes 12 in columns a few degrees inclined from the vertical, herein shown to be approximately four degrees, is to prevent the ball bearings from tracking and forming grooves on a die-set guide pin. The strip 10 is then formed into a cylindrical shell 18 (FIGURE 2) and the edges 14 and 16 are joined together by a suitable means such as welding, or the like. A plurality of flat strips of thin sheet material 20 (FIGURE 3) equal to or shorter than half-shell circumference are also pre-punched with holes 22 for forming seats for ball bearings, and each strip is formed into a sector 24 (FIGURE 4) of an outer-cylindrical shell. The curvature of the sector 24, and the radius thereof, is such that a predetermined number of sectors will form an outer-cylindrical shell 26 concentrically about the inner-cylindrical shell 18 (FIGURE 5), and the preformed holes 22 in the sectors 24 will register with the preformed holes 12 in the cylindrical inner-shell to retain ball bearings between each pair of matching holes. It will be observed that the edges 28 and 30 of the sheet 20 (FIGURE 3) are also inclined to the vertical and columns of holes 22 are parallel to these edges to provide complete registry with inner-cylindrical shell.

Figure 8:
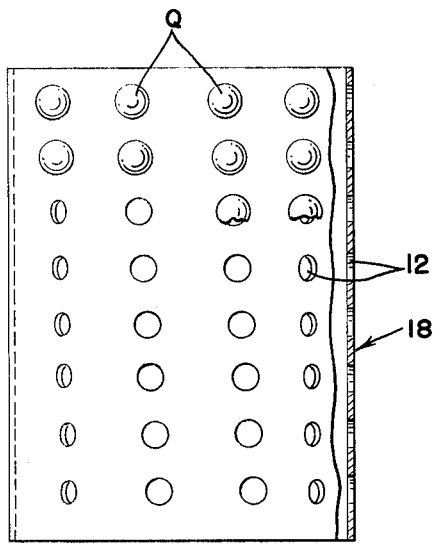
FIGURE 8 is a plan view of a horizontally disposed inner-cylindrical shell with ball bearings positioned in the ball bearing seats on the top surface of the cylindrical shell.
Figure 9:
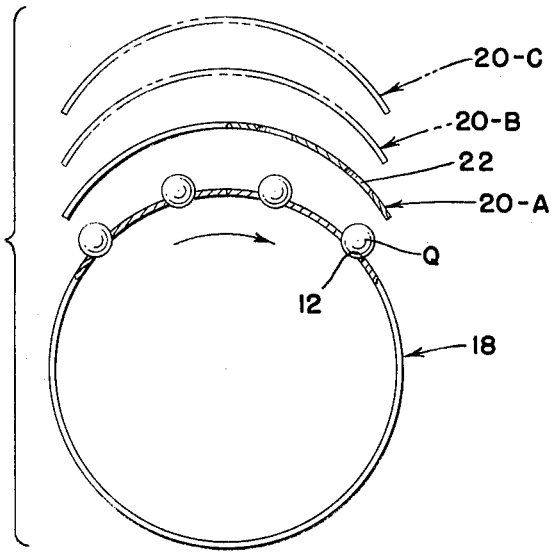
FIGURE 9 is an end view of the cylindrical shell shown in FIGURE 8 also illustrating the positioning of the ball bearings in the cylindrical shell seats and further showing the manner in which a cylindrical sector can be superposed on the seated balls to begin fabrication of the retainer.

A preferred method of making the ball bearing retainer R (FIGURE 5) includes the steps of mounting the inner-cylindrical shell 18 with its longitudinal axis in the horizontal, and placing or resting ball bearings Q in those holes on the top surface of the shell which will retain them without jigs, fixtures, or other exterior implementation. As shown in FIGURES 8 and 9, the top four rows of balls can safely be rested on the inner-shell 18. A cylindrical sector 20-A is then superposed on the balls and the holes 22 in the sector are brought into registry with the balls Q and the sector is fastened by pin or other means to the inner-shell 18. The inner-shell 18 is then revolved 120 degrees in the present instance when three sectors are used, and the operation is repeated until two sectors 20-A and 20-B and eight rows of balls Q are secured to the inner-shell. A third revolution of 120 degrees will bring about insertion of the last four rows of balls Q which are then secured to the inner-shell by a third sector 20-C. The inclined abutting edges 28 and 30 of the three sectors respectively are then secured by welding means, or the like, and the end portions of the retainer are sealed or otherwise secured together by a pair of spacer rings 32 and 34 which may be welded to the inner and outer shells 18 and 26 by well-known conventional means.

Figure 10:
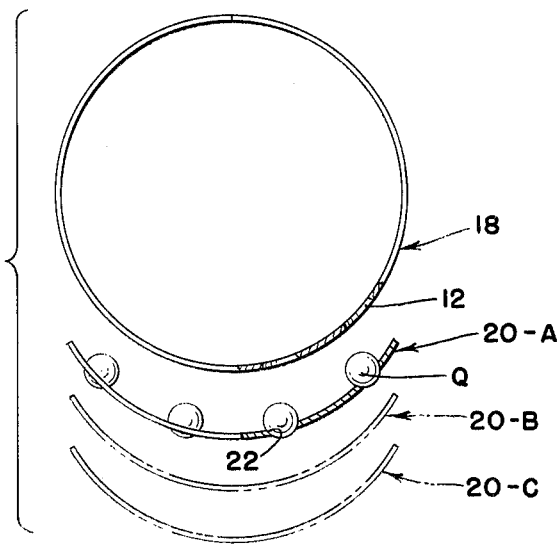
FIGURE 10 illustrates yet another method of fabricating the retainer wherein the balls are first placed on the concave surface of a cylindrical sector, the inner-shell is superposed thereon, and thereafter the operation is repeated with other cylindrical sectors until the inner-shell is completely and concentrically encircled by a plurality of cylindrical sectors.

In a second method of fabricating the ball bearing retainer R, the balls are placed on the concave surface of a cylindrical sector 20-A, as shown in FIGURE 10, and the cylindrical inner-shell 18 is then superposed thereon for registry between the holes 12 in the inner-shell and the ball bearings Q. The sector 20-A is again secured to the inner-shell 18 by conventional means, and a second sector 20-B is loaded with ball bearings Q and secured to the inner-shell 18 in like manner after the inner-shell has been revolved 120 degrees. This sequence of operations is again repeated with third sector 20-C until the inner-shell 18 is entirely encircled with sectors having ball bearings Q retained therebetween.

In yet a third method of forming the ball bearing retainer R, the inner-shell is suitably connected to a source of vacuum which tends to draw air from the inside of the shell 18 to enable a greater number of rows of balls to be retained in their seats on the upper convex surface of the shell. Sectors of greater arc may then be utilized in assembling the retainer. Thus, with the use of a vacuum device with the retainer R, as illustrated, additional rows of balls can be placed on the surface of the inner-cylindrical shell, and up to a semi-cylindrical sector may be superposed thereon. Of course, if the vacuum were sufficient, the balls could be placed about the complete periphery of the inner-cylindrical shell and the assembly of the outer-cylindrical sectors be made in one operation, wherein two semi-cylindrical sectors would be simultaneously superposed over the vacuum retained balls.

The balls Q are of slightly greater diameter than the space provided between the pin and the sleeve (not shown) in order to provide some pre-loading between the guide pin and sleeve. Thus, with reasonable maintenance and care, no stress or strain should be transmitted from the ball bearings to the retainer cage since all load should be taken up between the die set guide pin and die set sleeve by the ball bearings themselves. However, in high production shops experience has shown that little or no attention is paid to maintenance of ball bearing die sets such that dirt, chips, fines and other abrasive foreign substances find their way in between the inner and outer shells of the ball bearing retainer resulting in eventual damage to the retainer cage. Accordingly, it is contemplated in the present invention to provide a solid state lubricant between the inner and outer shell portions of the retainer which serves the dual purpose of keeping foreign matter from between the inner and outer cylindrical shells, and also providing lubrication which the ball bearings would not otherwise get.

Having described preferred embodiments of my invention, it will be understood that various other embodiments and methods of assembly will be recognized by those skilled in the art upon a reading of the specification taken in conjunction with the attached drawings, and such modifications are intended to be within the scope of the subjoined claims.

Having thus described our invention, we claim:

1. A ball bearing retainer for die sets comprising: an inner-cylindrical shell having a plurality of circular openings sized to seat ball bearings therein; a plurality of cylindrical sectors secured together to form an outer-cylindrical shell of circumference sufficient to encircle said inner-shell in concentrically spaced apart relationship said sectors having a plurality of circular openings positioned to register with the openings of said inner-shell and sized to retain said ball bearings therebetween; each sector being permanently joined to an adjacent sector by abutting edges defined by a line inclined to the generatrix of the outer-shell; said registered openings being aligned in rows parallel to said abutting edges; and spacer rings positioned and secured at opposite ends of said retainer between said inner and outer cylindrical shells.

2. The ball bearing retainer set forth in claim 1, wherein said outer cylindrical shell is comprised of at least three equal cylindrical sections permanently bonded each to the others along their abutting edges to concentrically encircle said inner cylindrical shell and to encase said ball bearings therebetween.

3. A ball bearing retainer for providing alignment and guidance between the post and bushing of a die set comprising: an inner cylindrical shell formed from sheet metal having a plurality of spaced openings sized to seat ball bearings therein; a plurality of cylindrical sectors formed from sheet metal and permanently secured together to form an outer cylindrical shell having a circumference sufficient to encircle said inner cylindrical shell in concentrically spaced apart relationship, said sectors having a plurality of spaced openings positioned to register with ball bearings seated in the openings of said inner cylindrical shell and sized to retain said balls between said inner and outer shells with sufficient clearance to allow free rotation of the ball bearings; and means permanently secured between said inner and outer cylindrical shells to maintain said shells in concentrically spaced apart alignment, whereby each of said balls is rotatably encased between and extending through said inner and outer cylindrical shells to provide rolling contact between said post and said bushing.

References Cited by the Examiner

UNITED STATES PATENTS

| | | | |
|---|---|---|---|
| 1,996,809 | 4/1935 | Hughes | 308—201 |
| 2,112,754 | 3/1938 | Annen | 29—148.4 |
| 2,525,622 | 10/1950 | Shafer | 308—201 |
| 2,706,137 | 4/1955 | Stricklen | 308—201 |
| 2,751,664 | 6/1956 | Arnit | 29—148.4 |
| 2,846,278 | 8/1958 | Blazek | 308—6 |
| 2,987,350 | 6/1961 | Hay | 308—201 |
| 3,023,487 | 3/1962 | Hinckley | 29—148.4 |
| 3,025,590 | 3/1962 | Litz | 29—148.4 |
| 3,043,634 | 7/1962 | Coley | 308—6 |

DON A. WAITE, *Primary Examiner.*

WHITMORE A. WILTZ, FRANK SUSKO, ROBERT C. RIORDON, *Examiners.*